United States Patent
Savstrom

(10) Patent No.: US 10,105,632 B2
(45) Date of Patent: *Oct. 23, 2018

(54) SELF-SUPPORTING FOLDED SHEET MATERIAL, FILTER ELEMENTS, AND METHODS

(71) Applicant: Donaldson Company, Inc., Minneapolis, MN (US)

(72) Inventor: Jacob C. Savstrom, Plymouth, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/302,837

(22) PCT Filed: Apr. 8, 2015

(86) PCT No.: PCT/US2015/024908
§ 371 (c)(1),
(2) Date: Oct. 7, 2016

(87) PCT Pub. No.: WO2015/157408
PCT Pub. Date: Oct. 15, 2015

(65) Prior Publication Data
US 2017/0028339 A1    Feb. 2, 2017

Related U.S. Application Data

(60) Provisional application No. 61/977,469, filed on Apr. 9, 2014.

(51) Int. Cl.
*B01D 46/52* (2006.01)
*B01D 46/24* (2006.01)

(52) U.S. Cl.
CPC ........ *B01D 46/522* (2013.01); *B01D 46/2411* (2013.01); *B01D 2275/201* (2013.01)

(58) Field of Classification Search
CPC .............. B01D 46/522; B01D 46/2411; B01D 2275/201
See application file for complete search history.

(56) References Cited

U.S. PATENT DOCUMENTS

| | | |
|---|---|---|
| 2,556,521 A | 6/1951 | Chase |
| 2,683,537 A | 7/1954 | Dobrolet |
| 2,862,624 A | 12/1958 | Stokes |

(Continued)

FOREIGN PATENT DOCUMENTS

| | | |
|---|---|---|
| DE | 19849998 A1 | 5/2000 |
| DE | 20005756 U1 | 8/2000 |

(Continued)

OTHER PUBLICATIONS

International Search Report for PCT/US2015/024908, dated Oct. 8, 2015.

*Primary Examiner* — Krishnan S Menon
*Assistant Examiner* — Waqaas Ali
(74) *Attorney, Agent, or Firm* — Merchant & Gould P.C.

(57) ABSTRACT

A pleated media pack includes a section of media configured into a tube defining an interior volume and an open opening at one end. At least some of the pleats at both ends of the media pack are inverted. In some examples, the pleats include major pleats alternating with minor pleats.

15 Claims, 18 Drawing Sheets

(56) References Cited

U.S. PATENT DOCUMENTS

| | | |
|---|---|---|
| 2,936,855 A | 5/1960 | Allen et al. |
| 2,980,208 A | 4/1961 | Neumann |
| 3,058,594 A | 10/1962 | Hultgren |
| 3,124,441 A | 3/1964 | Rivers |
| 3,386,232 A | 6/1968 | Gaines, Jr. |
| 3,401,803 A | 9/1968 | Bub |
| 3,410,062 A | 11/1968 | Hart |
| 3,440,807 A | 4/1969 | Gaines, Jr. |
| 3,531,920 A | 10/1970 | Hart |
| 3,640,396 A | 2/1972 | Brownell |
| 3,937,663 A | 2/1976 | Bessiere |
| 4,012,932 A | 3/1977 | Gewiss |
| 4,640,779 A | 2/1987 | Taki et al. |
| 4,673,503 A | 6/1987 | Fujimoto |
| 4,734,195 A | 3/1988 | Lhuillier et al. |
| 4,925,561 A | 5/1990 | Ishii et al. |
| 5,128,039 A | 7/1992 | Gabrielson |
| 5,230,455 A | 7/1993 | Price |
| 5,306,321 A | 4/1994 | Osendorf |
| 5,522,909 A * | 6/1996 | Haggard ............ B01D 46/0043 55/327 |
| 5,632,793 A | 5/1997 | Haggard |
| 5,804,073 A | 9/1998 | Ter Horst |
| 5,902,365 A | 5/1999 | Haggard |
| 6,641,637 B2 | 11/2003 | Kallsen et al. |
| 6,790,397 B2 | 9/2004 | Richerson et al. |
| 6,824,581 B1 | 11/2004 | Tate et al. |
| 2004/0134171 A1 | 7/2004 | Scott et al. |
| 2007/0278149 A1* | 12/2007 | Kuwabara .............. B01D 29/21 210/493.2 |
| 2011/0186504 A1 | 8/2011 | Rocklitz |
| 2015/0251111 A1 | 9/2015 | Savstrom et al. |

FOREIGN PATENT DOCUMENTS

| | | | |
|---|---|---|---|
| EP | 0206182 B1 | 3/1990 | |
| EP | 1197254 A1 | 4/2002 | |
| EP | 1681087 A2 | 7/2006 | |
| EP | 2042359 A1 | 4/2009 | |
| FR | 795282 A * | 3/1936 | ............ A62B 23/00 |
| FR | 1288229 A | 3/1962 | |
| FR | 2791579 A1 | 10/2000 | |
| JP | 06-079836 B2 | 10/1994 | |
| JP | 07008735 A * | 1/1995 | ............ B01D 29/21 |
| WO | 95/17945 A2 | 7/1995 | |
| WO | 00/40319 A1 | 7/2000 | |
| WO | 2005/037408 A1 | 4/2005 | |
| WO | 2005037408 A1 | 4/2005 | |
| WO | 2014/059014 A1 | 4/2014 | |

\* cited by examiner

SELF-SUPPORTING FOLDED SHEET MATERIAL, FILTER ELEMENTS, AND METHODS

This application is a US National Stage application of PCT International Patent Application No. PCT/US2015/024908, filed Apr. 8, 2015, which claims priority to U.S. Provisional patent application Ser. No. 61/977,469, filed Apr. 9, 2014, which applications are incorporated herein by reference. To the extent appropriate, a claim of priority is made to each of the above applications.

TECHNICAL FIELD

This disclosure relates to sheet material that is folded to maintain a degree of structural integrity and while the disclosure is aimed primarily at pleated filtration media used in media packs, filter elements, and methods of their manufacture, the disclosure can also be applied in other instances, where a folded sheet material can benefit from the structural integrity, flexibility and resilience offered by the present disclosure.

BACKGROUND

Permeable sheets of filtration media are used widely to remove contaminants from fluid streams and in order to achieve optimal performance of the filtration media, the surface of the sheet that is exposed to the fluid stream needs to be large, but in order to avoid excessive size of filtration elements, the sheets need to fit into small volumes and are typically pleated to maximize the ratios between filtration surfaces exposed to the fluid streams and the overall dimensions of the filtration elements.

When exposed to fluid steams, these filtration elements and the permeable sheets in them are exposed to forces from the fluid streams and need to withstand these forces sufficiently to ensure continued acceptable operation of the filter element. In particular, pleated sheets of permeable filtration media are often prone to deflection and adjacent sheets are often too close together or touch and thus prevent a well dispersed flow pattern of the fluid—and reduce the available surface area of the filtration media for loading—a phenomenon known as "masking". Further, in order to be cost effective, filtration elements made from sheets of permeable filtration media typically do not include structural supports for the filtration media, but rely on the structural integrity of the folded sheets themselves.

Pleated filtration media are typically formed from continuous or rolled webs and pleats are formed perpendicular to the "machine" or "reel" direction of the media, i.e. to the continuous direction of the media as it comes from a source, such as a supply reel. Simple alternating "zigzag" pleats are commonly used and are simple to form, but are prone to deflection and masking, especially in cases of deep pleats. Some methods have been proposed to inhibit deflection and/or retain spacing between adjacent pleats, but these methods tend to require complex (and thus costly) manufacturing methods (e.g. because they require adjacent layers of pleated filtration media to be attached together with adhesive), they are not versatile because their geometry is static, and/or they are prone to crushing and collapsing. The present disclosure seeks to address at least some of the challenges mentioned above and in particular to provide elements of folded sheet material with improved structural stiffness, flexibility and compressibility, or maximizing surface area, which can be manufactured cost-effectively.

Some techniques used previously include those described in U.S. Pat. Nos. 2,683,537 and 5,522,909, incorporated by reference herein.

SUMMARY

Pleated media packs for use in filter elements are provided. The media pack includes a section of filtration media folded into pleats; at least some of the pleats having a major pleat depth; the section of filtration media being configured into a tube defining an interior volume, first and second opposite ends; and an opening at the first end; the opening having a diameter; wherein at least some of the pleats at the first end are inverted an opposite direction of the rest of the pleat, along at least a portion of the pleat length from the first end toward the second end; and at least some of the pleats at the second end are inverted an opposite direction of the rest of the pleat, along at least a portion of the pleat length from the second end toward the first end.

In example aspects, the pleats include major pleats defining the major pleat depth, and minor pleats having a minor pleat depth that is less that the major pleat depth.

In example aspects, the major pleats and minor pleats alternate with each other.

In example aspects, the major pleats and minor pleats are arranged in a repeating pattern.

In example aspects, at least some of the major pleats at the first end are inverted an opposite direction of the rest of the pleat, along at least a portion of the pleat length from the first end toward the second end.

In example aspects, at least some of the minor pleats at the first end are inverted an opposite direction of the rest of the pleat, along at least a portion of the pleat length from the first end toward the second end.

In example aspects, the major pleats and minor pleats at the first end are inverted an opposite direction of the rest of the pleat, along at least a portion of the pleat length from the first end toward the second end.

In example aspects, at least some of the major pleats at the second end are inverted an opposite direction of the rest of the pleat, along at least a portion of the pleat length from the second end toward the first end.

In example aspects, at least some of the minor pleats at the second end are inverted an opposite direction of the rest of the pleat, along at least a portion of the pleat length from the second end toward the first end.

In example aspects, the major pleats and minor pleats at the second end are inverted an opposite direction of the rest of the pleat, along at least a portion of the pleat length from the second end toward the first end.

In example aspects, a ratio of the pleat depth to the opening diameter is greater than 0.1.

In example aspects, a ratio of the pleat depth to the opening diameter is not greater than 0.5.

In example aspects, a ratio of the pleat depth to the opening diameter is between 0.2 and 0.35.

In another aspect, a filter element is provided including a first open end cap secured to the first end of the media pack as characterized above; and a second end cap secured to the second end of the media pack.

In example aspects, the second end cap is a closed end cap.

In example aspects, the first open end cap defines an outlet opening for an exit of filtered fluid.

It is noted that not all the specific features described herein need to be incorporated in an arrangement for the arrangement to have some selected advantage according to the present disclosure.

DETAILED DESCRIPTION

In general, it has been learned that the pressure drop across a filter element is related to the diameter of the outlet of the clean fluid exit hole, when you have filter elements that filter from outside to inside. It has been observed that the performance gains in a filter element rise (performance gains being defined by a decrease in pressure drop), as a ratio of the pleat depth to the diameter of the air outlet increases. It has further been observed that to achieve a longer filter life, more filter media is used, but as more filter media is used by way of increasing the pleat depth, the outlet hole becomes smaller. However, it has also been observed that to get better performance, as measured by less of a pressure drop, one wants to make the outlet size larger.

Figure 1:
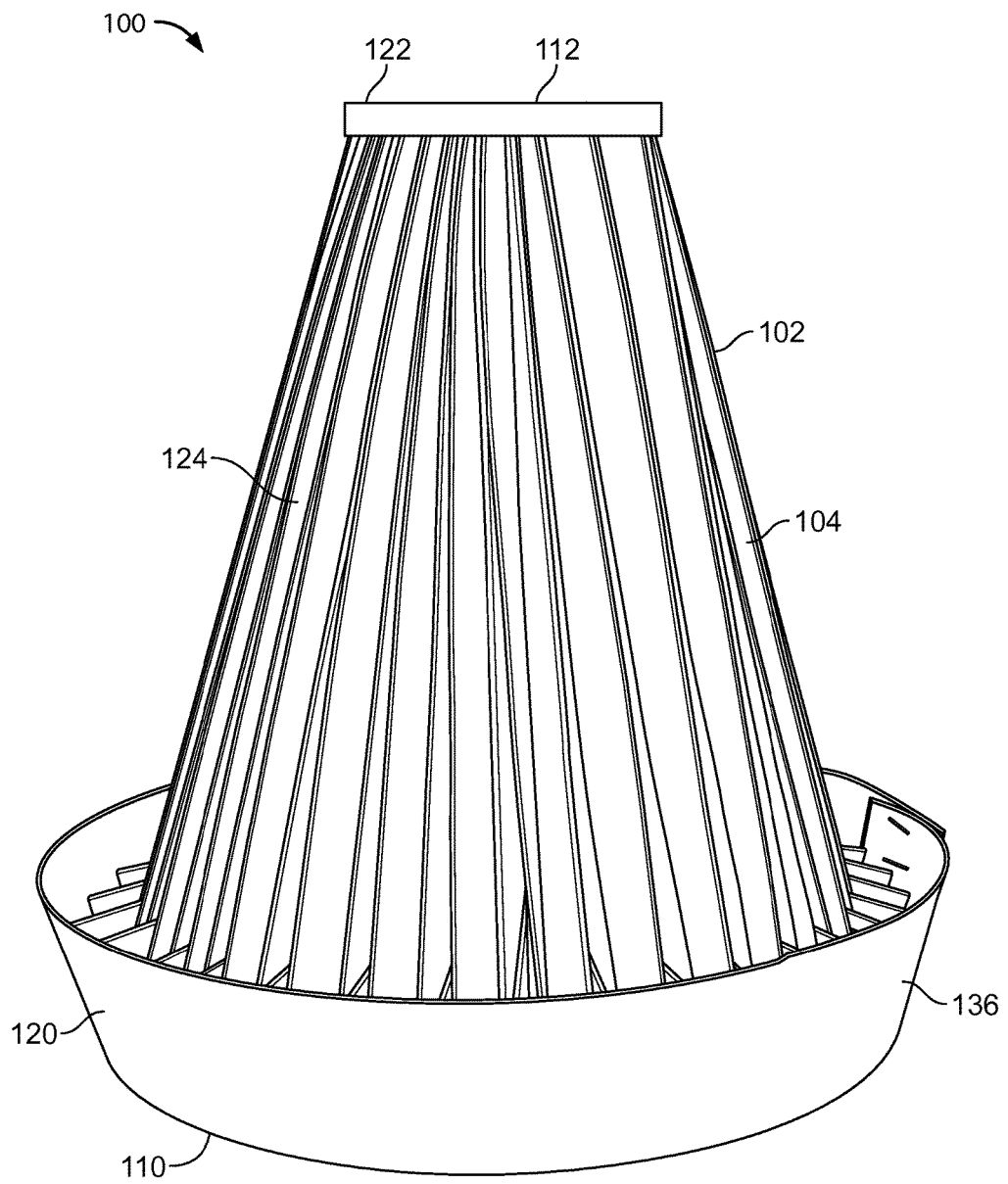
FIG. 1 is a side view of one example filter element, constructed in accordance with principles of this disclosure.
Figure 13:
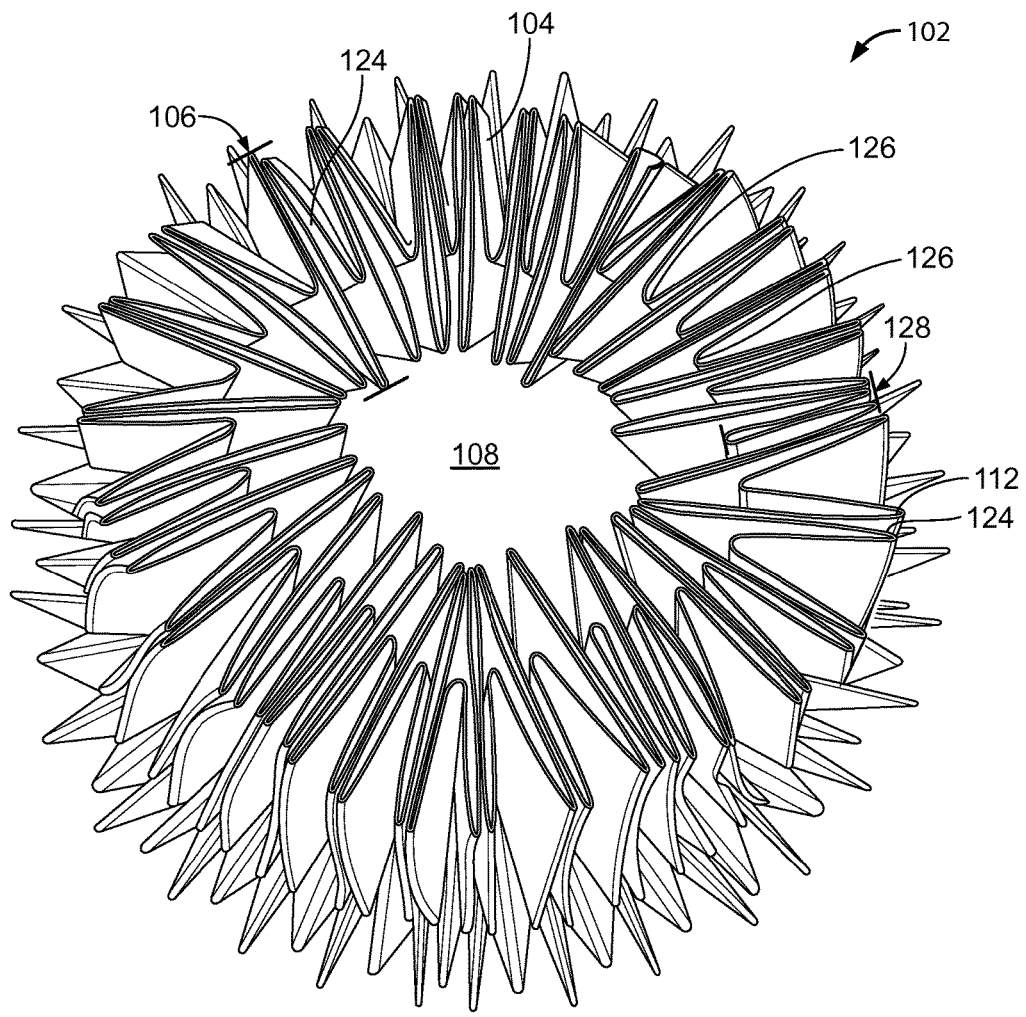
FIG. 13 is a top view of the media pack of FIG. 10.

In applying these principles, one example filter element 100 shown in FIG. 1 has been developed. The filter element 100 includes a pleated media pack 102. The pleated media pack 102 includes a section of filtration media folded into pleats 104. At least some of the pleats 104 have a major pleat depth 106 (FIG. 13).

Figure 2:
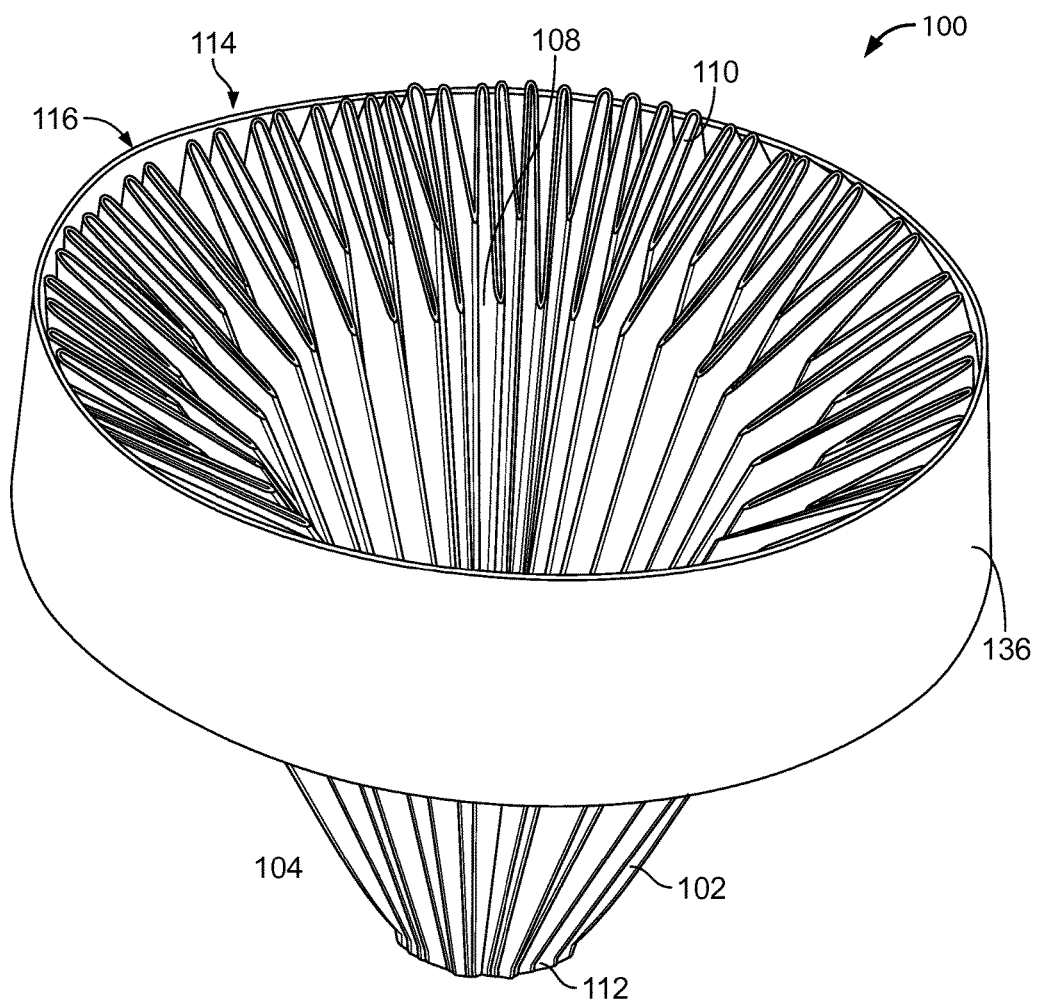
FIG. 2 is a bottom perspective view of the element of FIG. 1.

The section of filtration media of the pleated media pack 102 can be configured into a tube defining an interior volume 108 (FIG. 2). The pleated media pack 102 defines a first end 110 and an opposite second end 112.

The interior volume 108 of the tube is shown as have a circular cross-section, but can have a variety of cross-sectional shapes including oval or racetrack. In the embodiment depicted, the interior volume 108 is conical in shape. In other embodiments, the interior volume 108 can be cylindrical in shape.

In FIG. 2, it can be seen how at the first end 110 is an opening 114 providing access to the interior volume 108. The opening 114 will act as the outlet opening 116 for the element 100. That is, fluid to be filtered will enter the element 100 from outside of the pleated media pack 102, pass through the pleats 104 and then into the interior volume 108. From the interior volume 108, the filtered fluid will exit through the outlet opening 116. In references herein to the "diameter" of the opening 114, it refers to an outer diameter, if the opening 114 is generally circular. When not circular, the appropriate dimension is used.

As mentioned above, it has been learned that as the ratio of the major pleat depth 106 to the dimension, such as outer diameter (if circular; in other shapes, the appropriate dimension is used) of the outlet opening 116 increases, performance gains of the preferred embodiment as compared to a typical prior art cylindrical element rise, which means the pressure drop decreases. It has been found that a ratio of the major pleat depth to the outer dimension, such as diameter, should be greater than 0.1 to achieve both performance and life advantages.

In many implementations, it has been found that the ratio of major pleat depth to outlet dimension (such as diameter) should not exceed 0.5. When exceeding 0.5, in some filtering conditions, it can result in bunched up pleats.

In general, it has been learned that a ratio of pleat depth to outlet dimension, such as diameter, of between 0.2-0.35 achieves most benefits of better performance, as measured by the pressure drop.

In the element 100 shown in FIG. 1, a first end 110 is secured to a first end cap 120, depicted schematically in the FIGS. The first end cap 120 seals the pleats 104 to prevent bypass of filter flow. More details on the first end cap 120 are described further below. At the second end 112 is a second end cap 122. The second end cap 122 is secured to the pleats 104 to close the ends. The second end cap 122 can either be a closed end cap or an open end cap.

In example embodiments, the pleats 104 include major pleats 124 defining the major pleat depth 106.

It has been observed that as the pleat depth 106 increases, the pleat spacing along the outside of the element also increases for a given pleat spacing at the inside diameter. It has been observed that the spacing around the outside of the element does not need to be so widely spaced, so the addition of the minor pleats 126 improves performance by adding more media to the element 100.

The pleats 104, in example embodiment illustrated, includes minor pleats 126. The minor pleats 126 have a minor pleat depth 128 (FIG. 13) that is less than the major pleat depth 106.

Various embodiments can be made. In the example embodiment shown in FIGS. 10-13, the major pleats 124 and the minor pleats 126 alternate with each other.

In one or more embodiments, the major pleats 124 and minor pleats 126 can be in a repeating pattern.

In one or more embodiments, the major pleats 124 will all have an approximate equal pleat depth to each other.

In one or more embodiments, the minor pleats 126 will all have an approximate equal pleat depth to each other.

In one or more embodiments, the major pleats 124 and minor pleats 126 can be in a repeating pattern, in which the major pleats 124 will all have an approximate equal pleat depth to each other, and the minor pleats 126 will all have an approximate equal pleat depth to each other. In some of these arrangements, the major pleats 124 and the minor pleats 126 alternate with each other.

Figure 3:
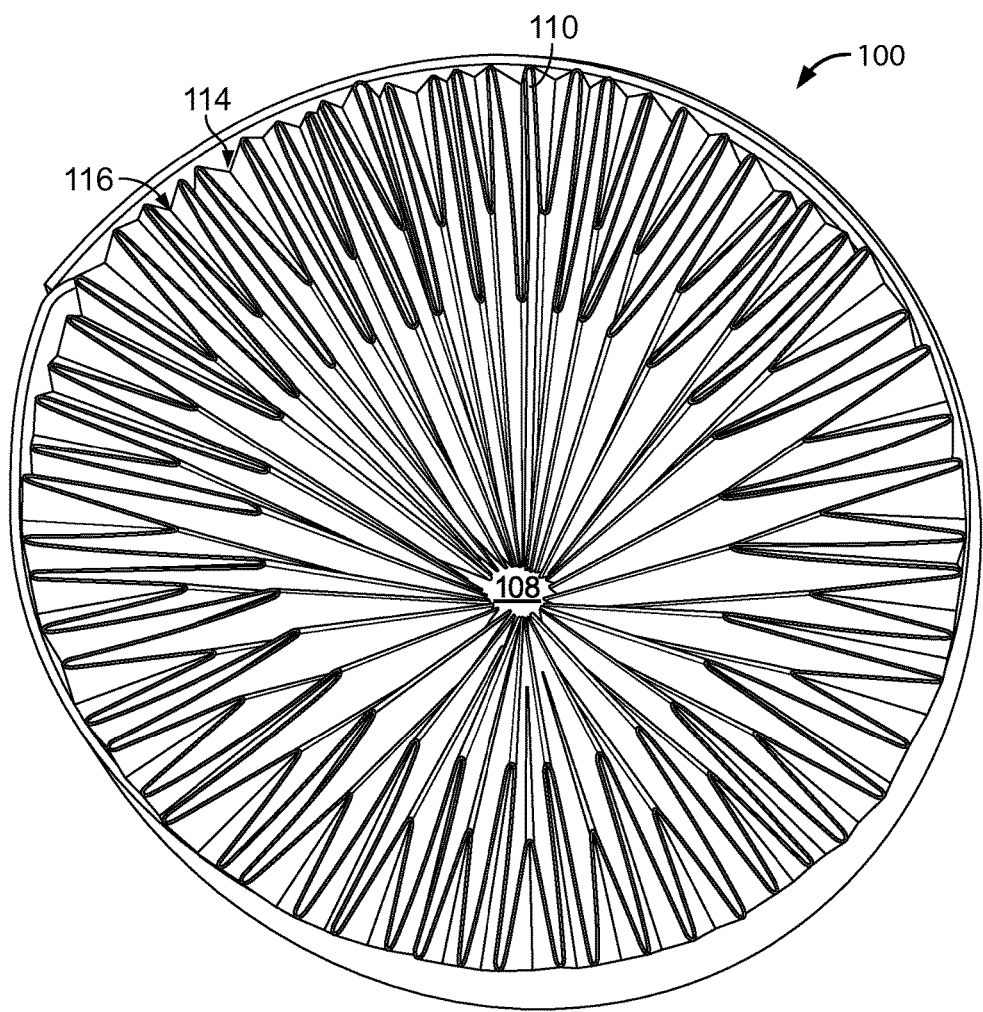
FIG. 3 is an end view of the bottom of the element of FIG. 1.
Figure 4:
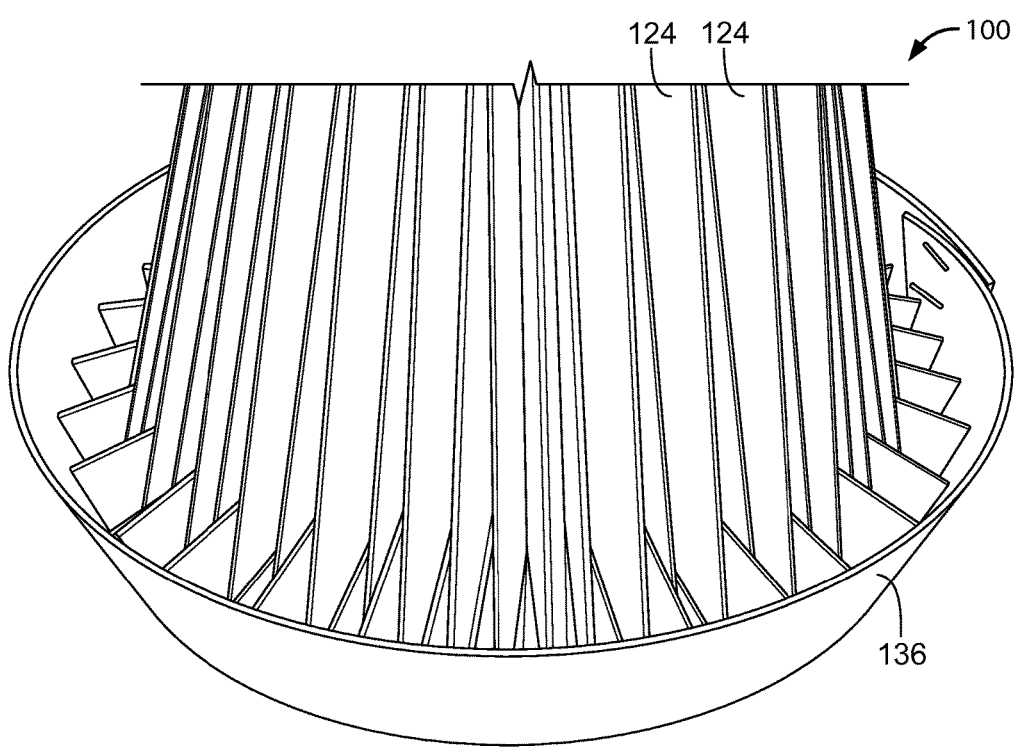
FIG. 4 is a close-up, perspective view of the bottom end of the element of FIG. 1.

Attention is directed to FIGS. 9-13. The pleated media pack 102 is illustrated before being formed into the element 100 having end caps 120, 122. In the example embodiment shown, the pleated media pack 102 is configured to increase size of the fluid flow outlet, being formed at the opening 114 (FIGS. 2 and 3), which results in performance improvement (less pressure drop across the media pack 102). For example, to increase the size of the opening 114, at least some of the pleats 104 at the first end 110 are inverted an opposite direction of the remaining portion, or rest, of the pleat 104. The inverted section 132 extends from the first end 110 along at least a portion of the pleat length from the first end 110 to the second end 112.

In the example illustrated, the inverted section 132 extends from the first end 110 not greater than 50% of the length to the second end 112. In some implementations, the inverted section 132 extends from the first end 110 at least 5% of the length to the second end 112. In some implementations, the inverted section 132 extends from the first end 110 between 10%-30% of the length to the second end 112.

Figure 10:
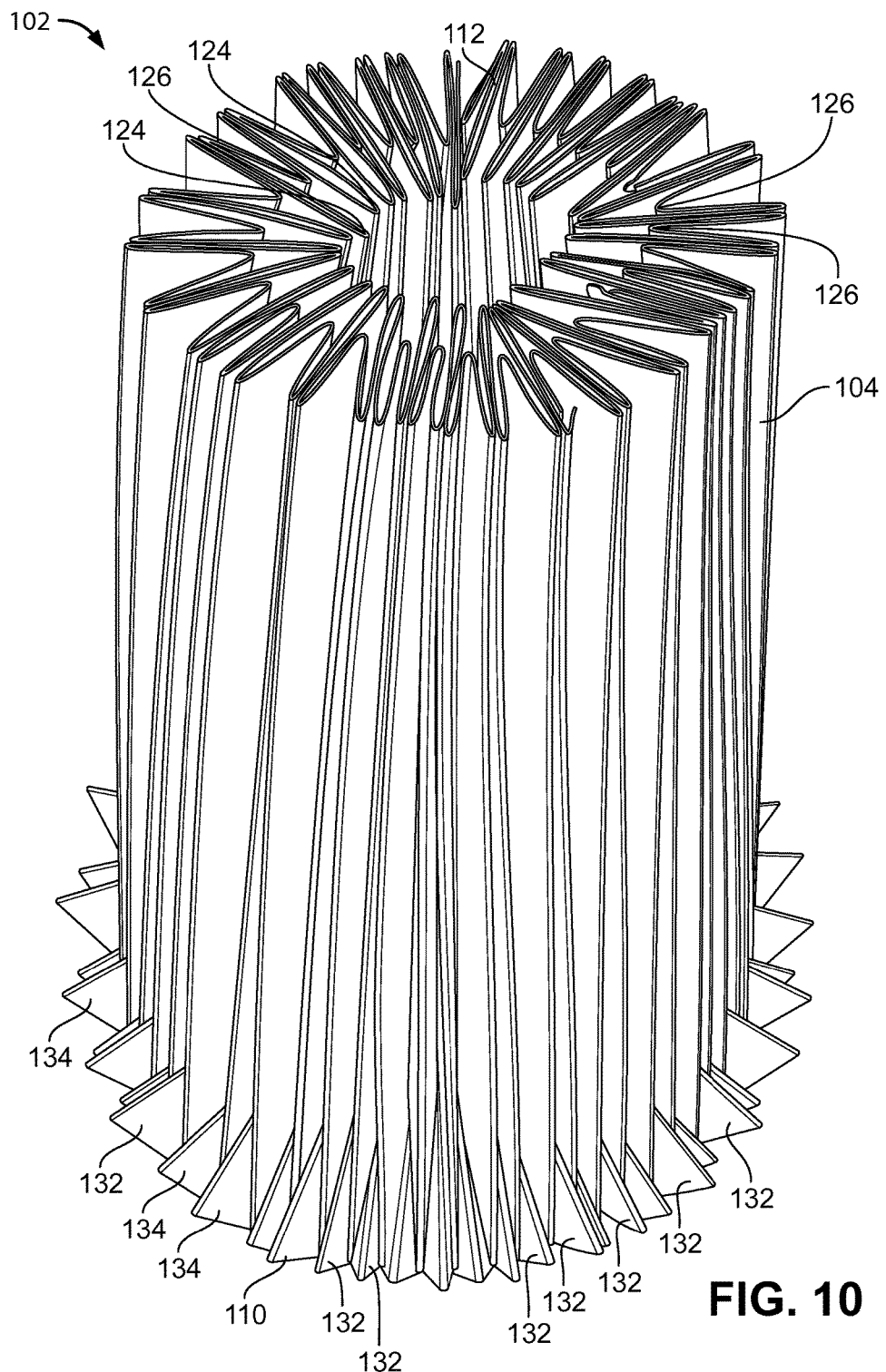
FIG. 10 is a top perspective view of the media pack formed from the media sheets of FIGS. 28-30 during one step of being made into the element of FIGS. 1-4.
Figure 11:
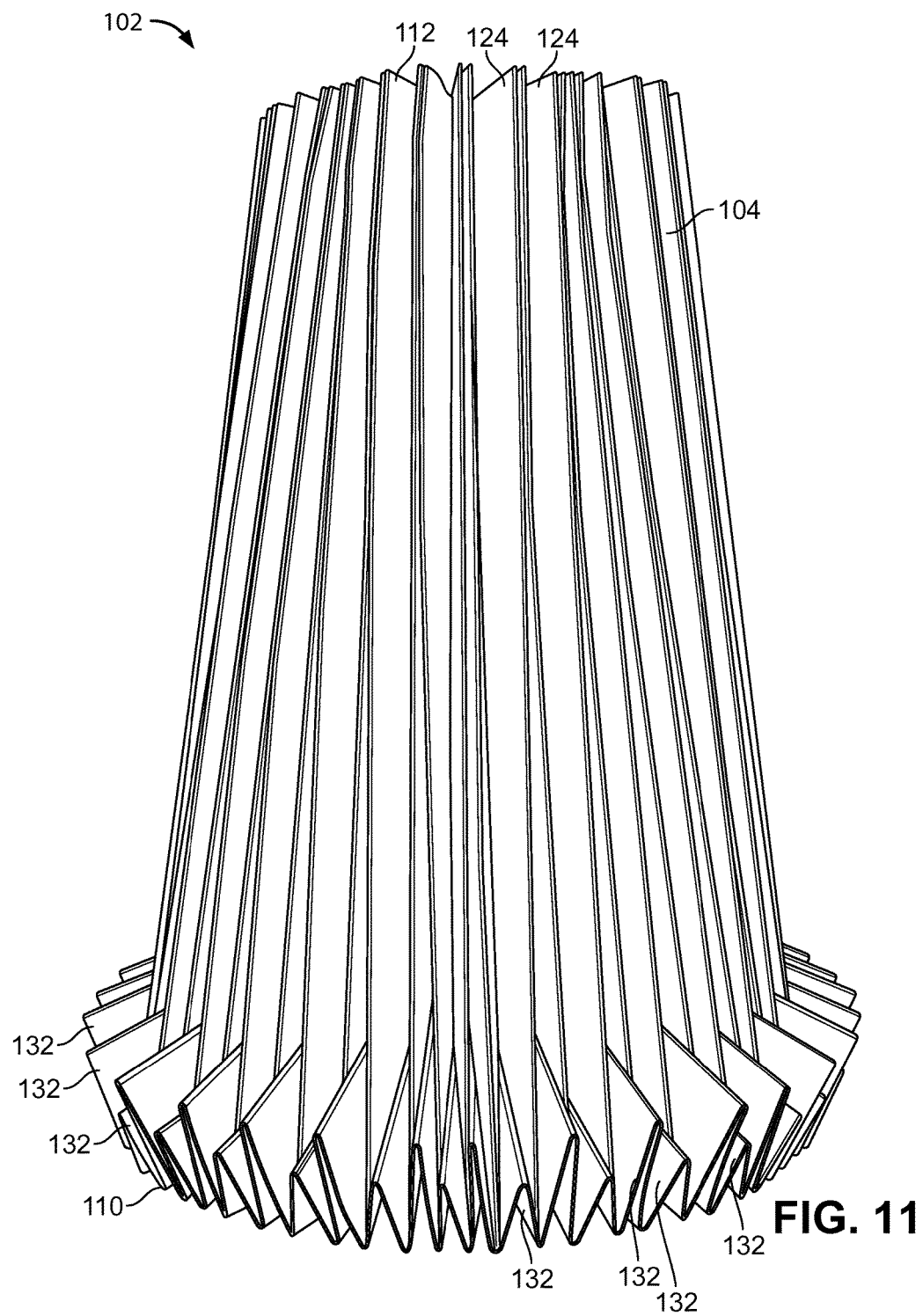
FIG. 11 is a side view of the media pack of FIG. 10.
Figure 12:
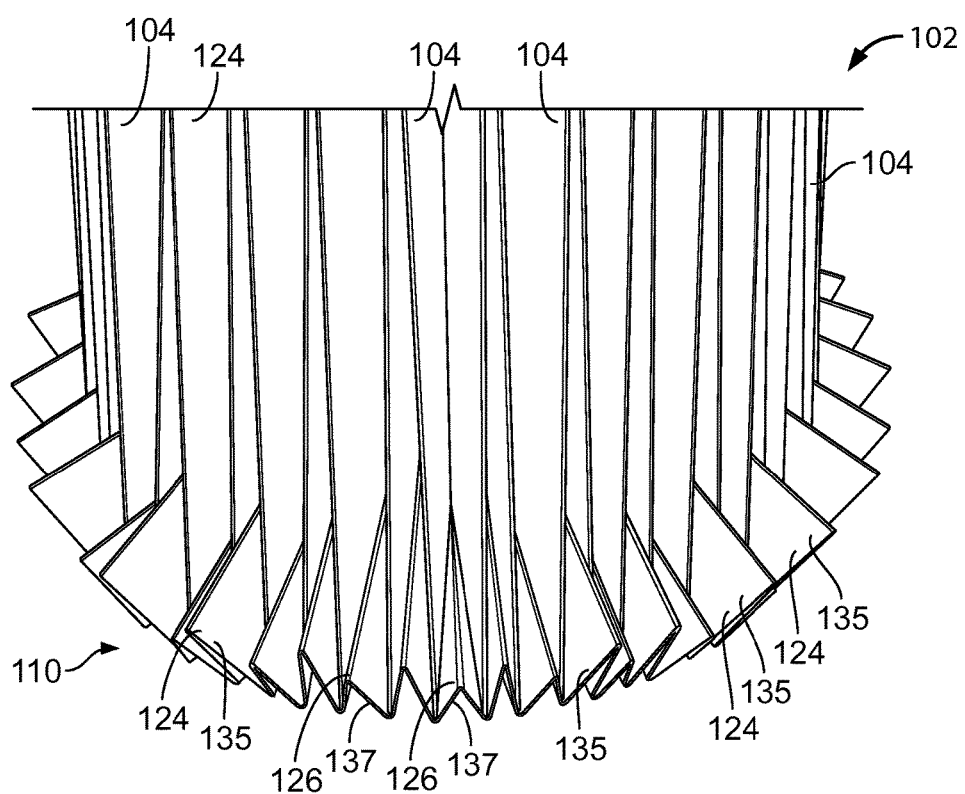
FIG. 12 is a close-up perspective view of the bottom end of the media pack of FIG. 10.

As can be seen in FIG. 10, the inverted sections 132 appear as triangular extensions 134 of media projecting from a remaining portion of the pleated media pack 102.

In some embodiments, at least some of the major pleats 124 at the first end 110 are inverted at section 135 (FIG. 12) in an opposite direction of the rest of the pleat 104.

In some embodiments, at least some of the minor pleats 126 at the first end 110 are inverted at section 137 (FIG. 12) an opposite direction of the rest of the pleat 104.

In some embodiments, at least some of both the major pleats 124 and minor pleats 126 at the first end 110 are inverted at sections 135, 137, respectively, in an opposite direction of the rest of the pleat 104, along at least a portion of the pleat length from the first end 110 toward the second end 112.

In some embodiments, all of the major pleats 124 and minor pleats 126 at the first end 110 are inverted an opposite direction of the rest of the pleat 104, along at least a portion of the pleat length from the first end 110 toward the second end 112.

In some example embodiments, in general, the second end 112 does not include inverted sections 132, but will be the normal pleat folded direction. In other example embodiments (e.g., see FIGS. 20-23, described below), the second end 112 does include inverted sections 232, such that both the first end 110 and second end 112 have inverted sections.

As can be seen in FIG. 1, in general, an outer profile shape of the media pack 102 can be generally conical, with an inner diameter at the first end 110 being greater than an inner diameter at the second end 112. In other embodiments, the outer profile shape of the media pack 102 can be generally cylindrical, in which the inner diameter at the first end 110 is general equal to the inner diameter at the second end 112.

Attention is again directed to FIGS. 11-13. The first end cap 120 is shown schematically, and schematically represents a section of a potting compound 136, or urethane material, that can be used to seal the media pack 102 along the radial outer periphery of the pleated media pack 102. This includes the inverted sections 132 of the pleats 104. The first end cap 120 can be made by using a centrifugal control for the potting compound 136. The centrifugal control to apply the potting compound 136 results in at least two benefits. The first benefit is that not as much potting compound 136 is needed, as compared to processes that use a free rise molding technique. The second benefit is that not as much filter media is masked through the centrifugal control, as compared to molding in a free rise molding process.

FIGS. 5-9 illustrate a media sheet 140 before it is formed into the pleated media pack 102.

Figure 5:
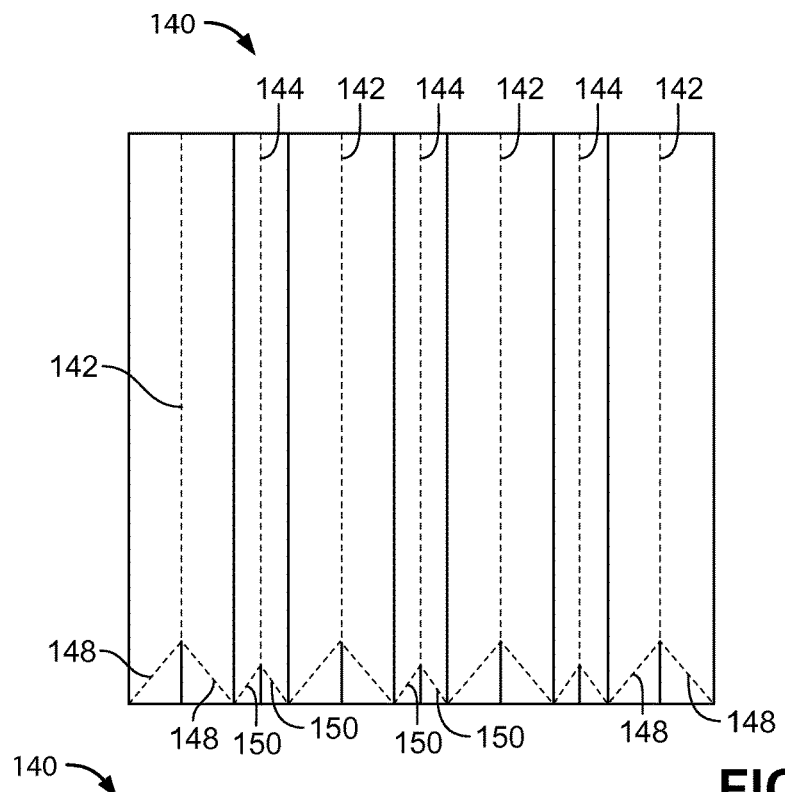
FIG. 5 is a top view of a sheet of filtration medium showing a scoring pattern used to make the filter element of FIGS. 1-4.

FIG. 5 shows a flattened piece of media sheet 140 with the scoring pattern. The solid lines illustrate fold lines that are folded upwardly and out of the paper, while the broken lines illustrate fold lines that are folded downwardly or into the paper. The fold lines 142 form the major pleats 124, while the fold lines 144 form the minor pleats 126.

The diagonal fold lines 148 form the inverted sections 135 for the major pleats 124. The diagonal fold lines 150 form the inverted sections 137 for the minor pleats 126.

Figure 6:
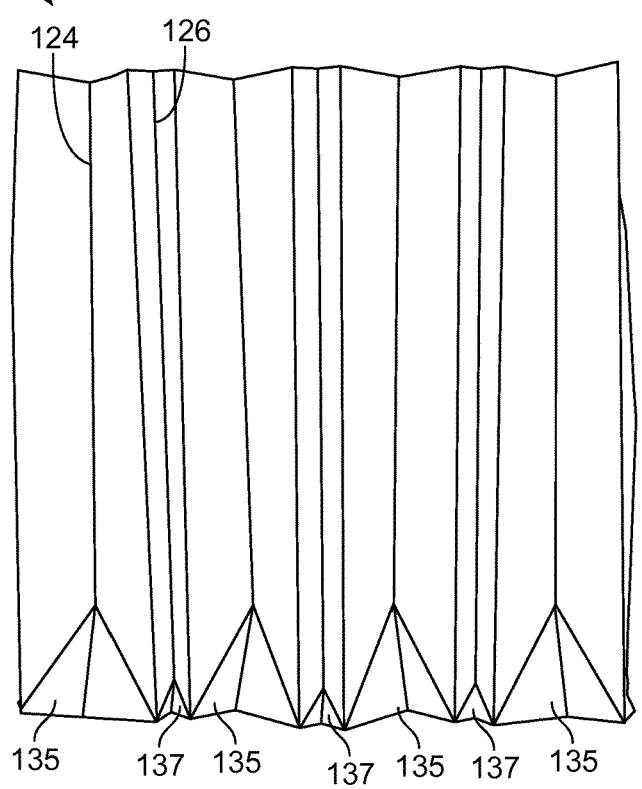
FIG. 6 is a top view of the media of FIG. 5 folded along the scoring pattern, and before it is formed into the filter element of FIGS. 1-4.

FIG. 6 is a top view of the media sheet 140 folded along the score lines of FIG. 5, and before the media sheet 140 is formed into the pleated media pack 102.

Figure 7:
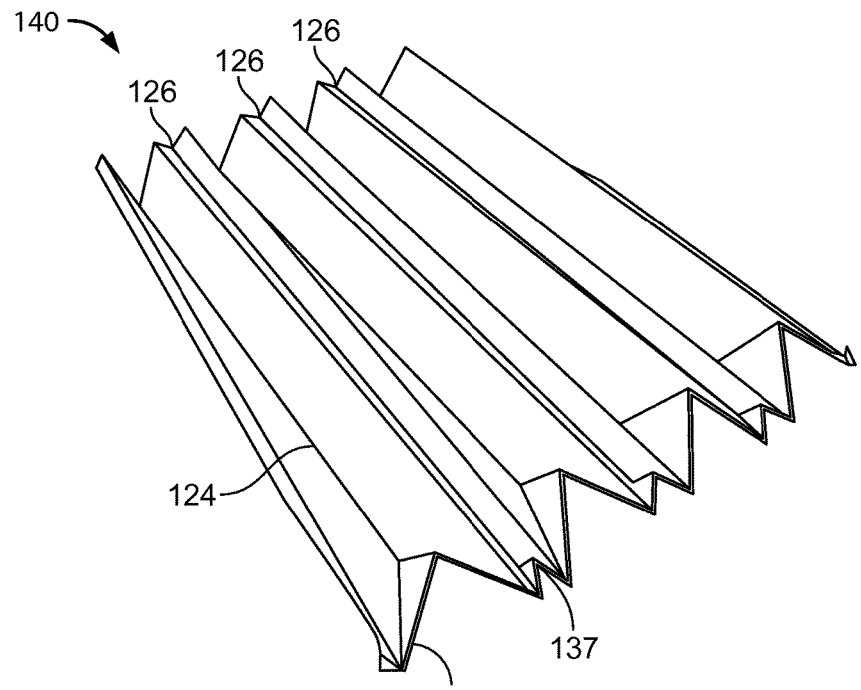
FIG. 7 is a perspective view of the folded media sheet of FIG. 6.
Figure 8:
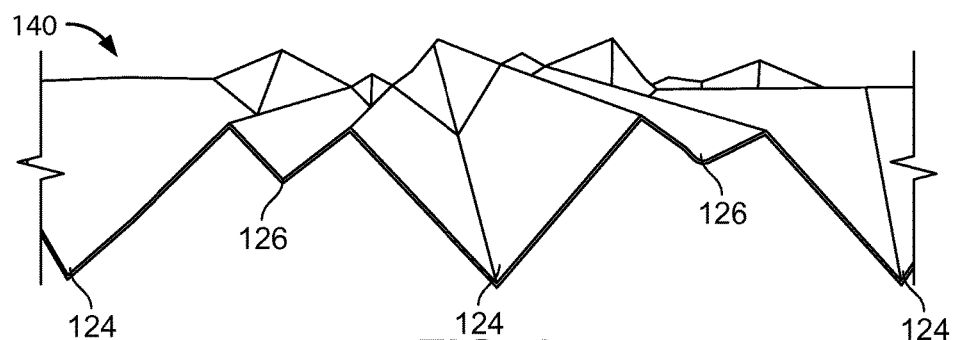
FIG. 8 is one end view of the folded media of FIG. 6.
Figure 9:
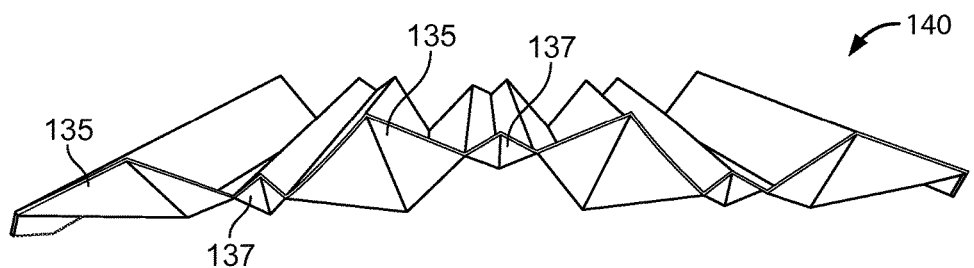
FIG. 9 is an end view of the folded media sheet of FIG. 6 showing the opposite end from the end being shown in FIG. 8.

FIG. 7 is a perspective view of the media sheet 140 of FIG. 6. FIGS. 8 and 9 show opposite end views of the media sheet 140 of FIGS. 6 and 7.

The media sheet 140 can be cellulose with or without fine fiber. Many variations can be used.

EXPERIMENTAL

Executive Summary

Some analysis and initial tests were completed with pleating configurations as described herein with the inversion of a triangular section of the pleat nearest the outlet in a manner that increases the outlet size of the element, as illustrated in FIGS. 1-13. The pleating configurations described in this experimental section represented a 12% increase in media area and a 70% increase in the outlet area of the element for similar space velocities (volumetric flow/element volume). This resulted in a 14% decrease in initial pressure loss and a 26% increase in dust capacity at the element terminal pressure loss for the first prototypes.

There can be significant pressure losses in a radial pleated element that are realized after the air has passed through the media.

The pleat concentration in a radial pleated element decreases as a point travel. radially outward from the inner diameter to the outer diameter.

Pleat Tip Inversion

Figure 14:
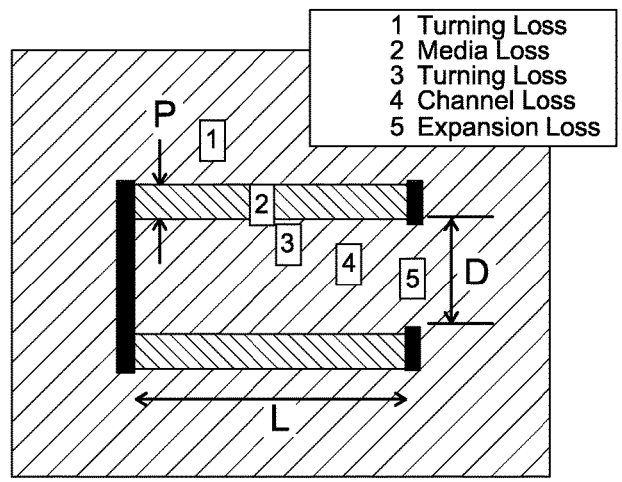
FIG. 14 is a schematic diagram used in an experimental analysis to compare various elements with an element constructed according to FIGS. 1-13.

In an element cross-section that takes the form shown in FIG. 14, and using a lumped parameter approach to pressure drop calculations, then the discrete pressure loss contributions can be identified that should add up to the total pressure loss of the element as an assembly.

The inverted pleat concepts described herein can mitigate the losses experienced at location five (FIG. 1) where the air can see an expansion or contraction (depending on application) by lowering the velocity at this point. A known equation for the so-called "minor loss" at this point is:

$$P = C_L \tfrac{1}{2} \rho V^2$$

where P is the pressure loss, ρ is the density of the fluid, $C_L$ is a loss coefficient, and V is the local velocity. For a radially pleated element with a circular outlet, the velocity of the outlet is proportional to the area, or the diameter squared. This means that the contribution of this loss at location five is proportional to the fourth power of the element outlet diameter.

Figure 15:
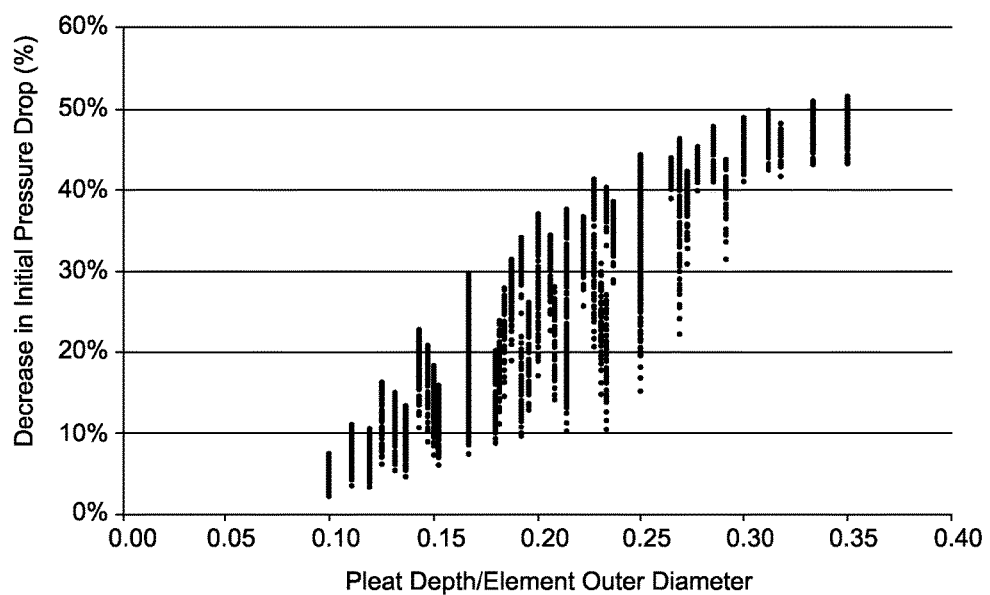
FIGS. 15-19 are graphs showing results of an experimental analysis to compare various elements with an element constructed according to FIGS. 1-13.

By inverting the pleats at the outlet the end cap or sealing area is moved to the outer diameter of the element and the outlet diameter can now be increased to the outer diameter of the element without compromising or complicating the seal. Using the lumped parameter approach to calculate the contributions of the media pack to the overall pressure loss (location 2 in FIG. 14), a parametric analysis was constructed to look at the sensitivities of pressure drop on several different element attributes. FIG. 15 shows the trend of a dimensionless ratio of the pleat depth to element diameter plotted against the expected decrease in pressure loss. The results suggest that as the pleat depth increases for a given element outer diameter, the gains from inverted pleats increase.

Pleat Concentration Leveling

Figure 16:
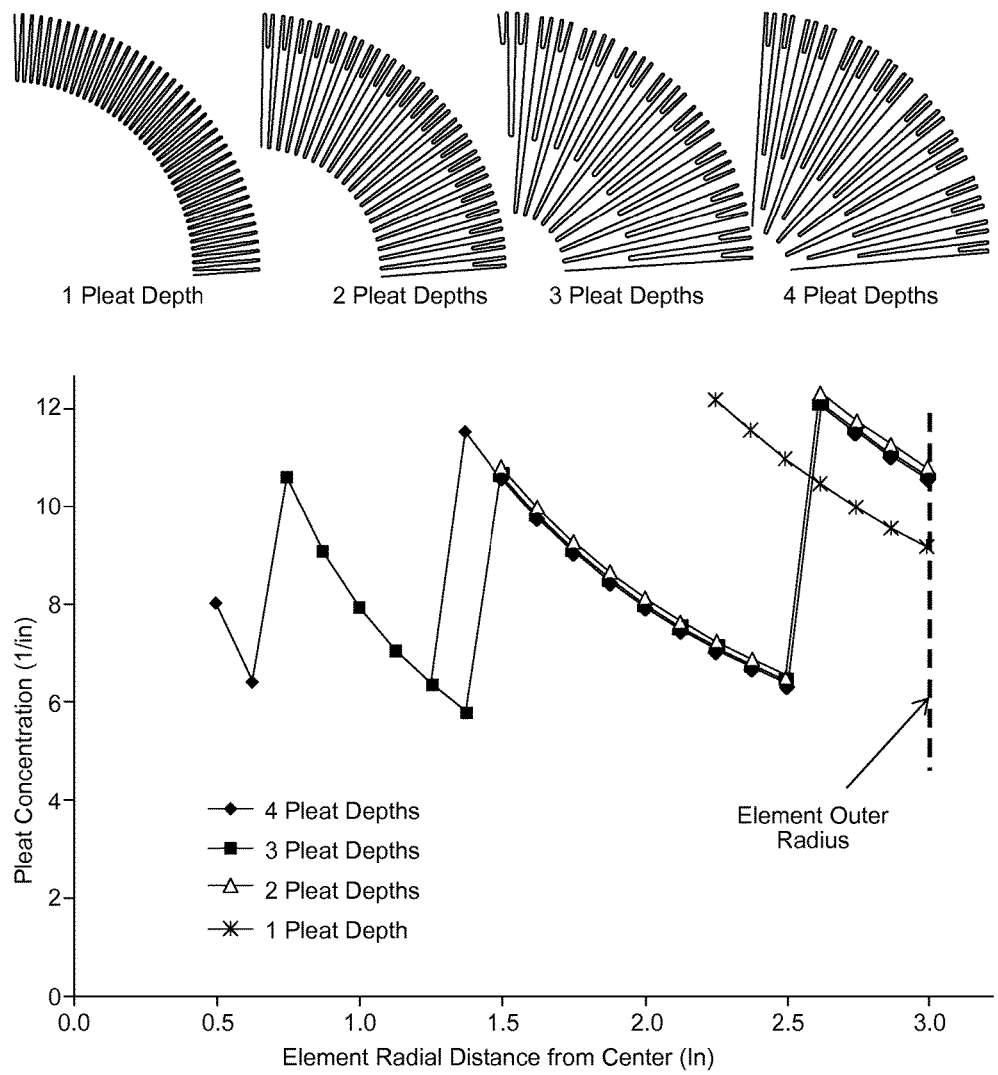

In a typical pleated, radial product the pleat concentration at the inner diameter is around 12 pleats per inch, where the outer diameter may have a pleat concentration of 7-8 pleats per inch. This represents a loss in potential media area for a given element size. One known way to increase media area is to put a combination of deep and shallow pleats into the same element, and fill more of the overall volume of the element with media (presumably increasing the life of the element). This results in higher pleat concentrations over a greater radial distance. A non-optimized example of this is shown in FIG. 16.

Even though the "4 Pleat Depths" example has nearly twice the media area of the "1 Pleat Depth" example, the flows associated with a six inch element could result in very high pressure drops with a one inch outlet.

While a product with very deep pleats for a given diameter can utilize the pleat inversions, the pleat concentration implications with one pleat height may result in very low pleat concentrations at the outer diameter. Using pleat concentration leveling techniques as shown in FIG. 16 will increase media area, but can result in a restrictive element. The analysis suggests that a reasonable combination of these two concepts can result in meaningful gains in media area while not increasing the initial pressure drop.

Air Lab Testing

A test matrix was constructed to compare: (i) the standard element construction (cylindrical, pleated element) with that of (ii) variable height pleat elements (e.g., "w pleats"); and (iii) the variable height pleats ("w pleats") with inverted tips of FIGS. 1-13. A housing was not used, and the elements were attached directly to a piezometer with supplied fixtures. For each test, a pressure drop sweep to 500 scfm was completed before the dust loading test, which was run at 275 scfm. The terminal restriction for each of the loading tests was 25 in H2O.

| | Std. Product | Std. Product (Cut to match Height of Others) | Variable heightPleat | Variable heightPleat + Inversions (FIGS. 1-13) |
|---|---|---|---|---|
| Flow (scfm) | 275 | 275 | 275 | 275 |
| Media Face Vel (fpm) | 7.9 | 10.4 | 9.2 | 9.2 |
| Outer Diameter (in) | 6.5 | 6.5 | 6 | 6[1] |
| Inner Diameter (in) | 4.25 | 4.25 | 3 | 3 |
| Length (in) | 13.5 | 10 | 10 | 10 |
| Outlet Piezometer (in) | 3.5 | 3.5 | 2.75 | 6 |
| Number of Samples | 3 | 2 | 3 | 3 |

Figure 17:
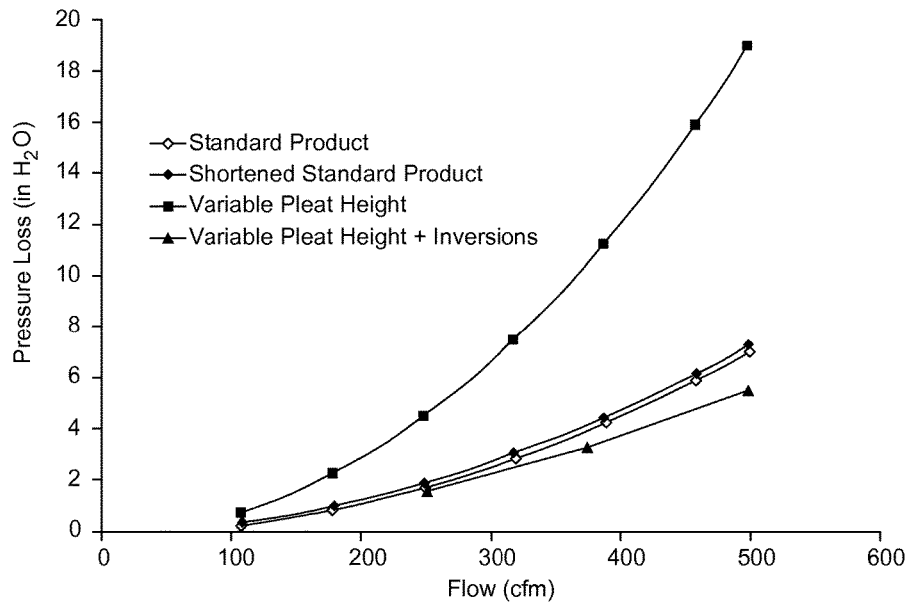

[1]The inverted pleats add 1.75" to the diameter of the element for the 1.5" closest to the outlet. The potting operation used for the prototypes would allow this to be decreased to a 0.5" addition to the diameter The flow vs. pressure loss curves show that the variable height pleat elements with the 2.75" piezometer are more restrictive than the other elements, yet the variable height pleats with inversions yield the lowest pressure loss, even though these two samples have the same media area. See FIG. 17.

Figure 24:
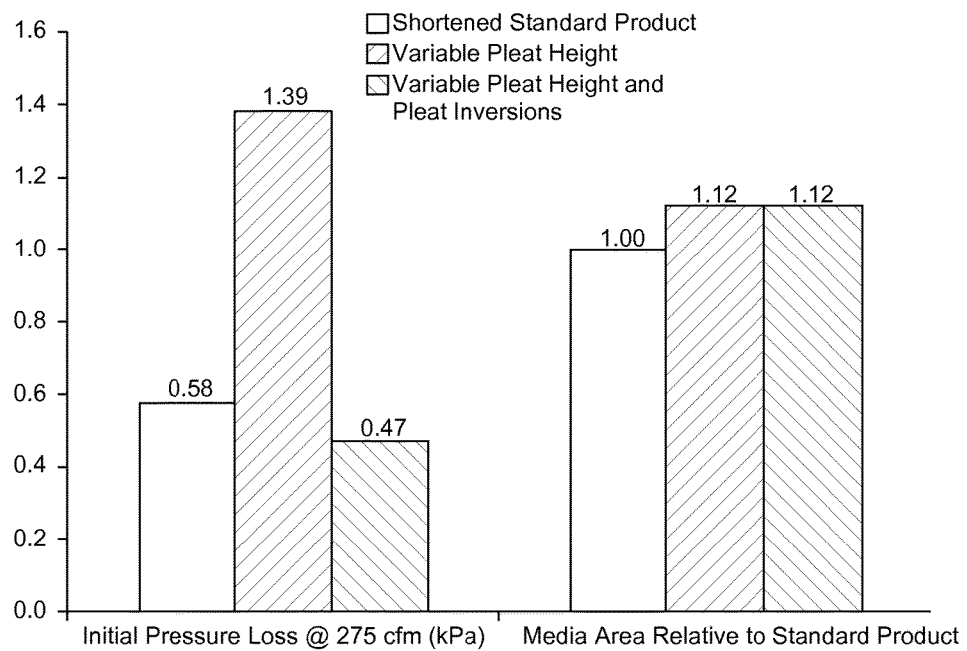
FIG. 24 is another graph showing results of an experimental analysis to compare various elements with an element constructed according to FIGS. 1-13.

[1] The inverted pleats add 1.75" to the diameter of the element for the 1.5" closest to the outlet. The potting operation used for the prototypes would allow this to be decreased to a 0.5" addition to the diameter FIG. 24 illustrates the measured initial pressure loss, comparing: (i) the standard pleated cylindrical element; (ii) the element with the variable height pleats; and (iii) the element having variable pleat heights and pleat inversions of FIGS. 1-13. As can be seen in FIG. 24, the initial pressure loss is the least with the element made according to FIGS. 1-13, while the media area is roughly equal.

Figure 18:
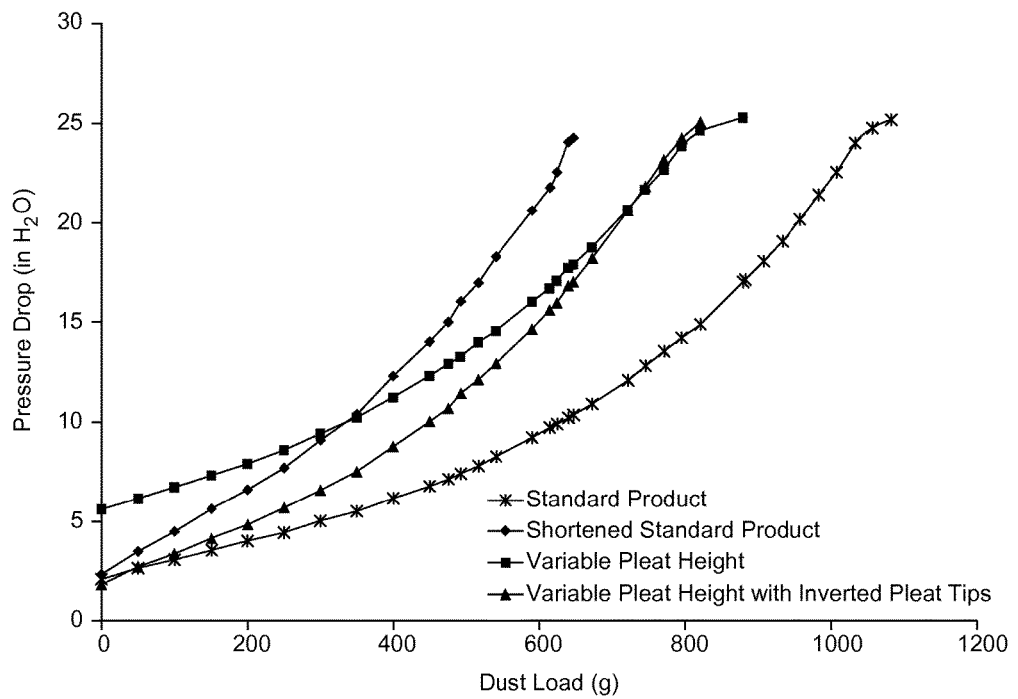

The dust testing results shown in FIG. 18 show the larger un-cut element (standard cylindrical pleated element) operating at a much lower space velocity (volumetric flow rate/element volume), and it also has the most media of all cases tested. To mitigate these differences, two of the standard, cylindrical pleated elements were shortened to the same length as the variable height pleat elements and inverted pleat elements of FIGS. 1-13. In this manner, a (near) direct comparison can be made between the three different pleating configurations. While the variable height pleat elements start at a higher restriction, they load slower due to the increase in media. The variable height pleat elements with the inversions (FIGS. 1-13) have the same media area, but seem to load much faster, even though they start at a much lower pressure drop.

Figure 19:
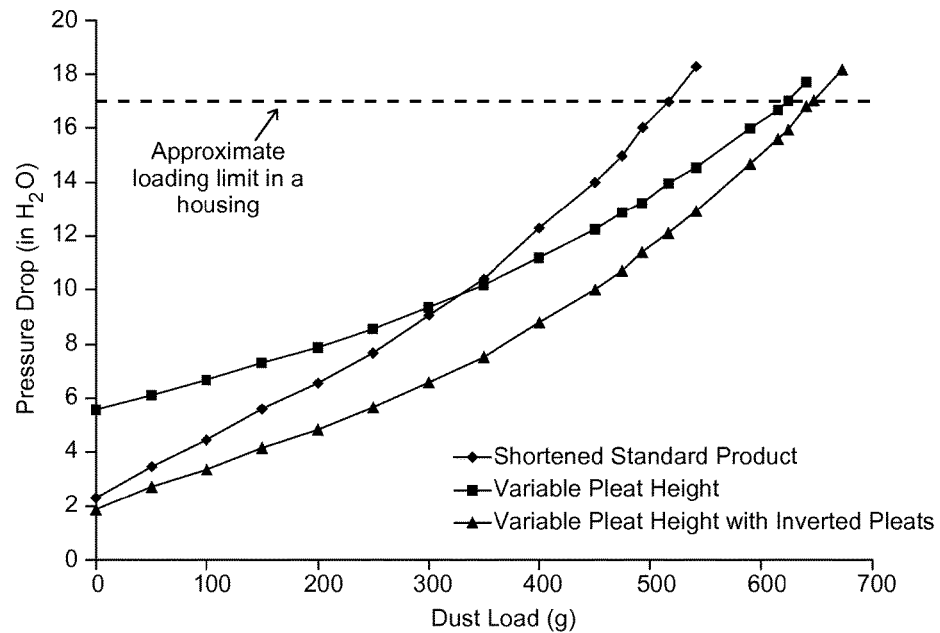

In a given application, the housing will also contribute to the initial restriction as well. For this reason, the terminal pressure drop due to the element is something closer to 17 in H$_2$O for the comparison considered here. FIG. 19 draws a comparison with this data as it applies to the element in a housing. This figure uses the shortened standard pleated element as the baseline and caps the loading plot at 17 in H$_2$O. In this case there is still only a marginal life difference between the variable height pleat with and without inversions, but both of them represent a 20% or greater life increase over the baseline.

A tabular representation of this dust loading data and element characteristics is shown in Table 2. Some noteworthy characteristics are the space velocities for each of the elements and the specific dust loading calculations at the bottom of the table.

The turned out area at the bottom of the inverted pleat elements was not counted as part of the diameter (though it is included in the element and pack volume calculations). The manner in which this was handled may be different for a given application Aside from the raw dust loading numbers, two other calculations were made to normalize the dust load to the space allotted. The first of which is the "Element Load (g/in$^3$) @ 15" H$_2$O Rise" which is the grams of dust collected at 15 in H$_2$O rise divided by the total volume of the element, including its interior volume that does not contain any media[2]. The basis for this was to look at how well the space inside the entire element volume was used as a dust collection medium, independent of the initial pressure drop. The other metric used was the "Pack Load (g/in$^3$) @ 15" H$_2$O Rise", which was intended to illustrate how well the volume of the media pack itself was loaded. The notion behind this is that this number would be highest when the ideal pleat concentration was achieved, and the dust loading was as even as possible.

Based on some of these performance metrics, the convergence of the dust loading curves at the end of life between the variable height pleat and variable height pleat with inverted tips (element of FIGS. 1-13) is thought to be due to less effective use of the available media area, and the decrease in the pack volume[3]. In the area of the inversions, the pleat density doubles where the inverted sections of the pleat overlap the non-inverted section. This increases the flow resistance of this area, and also decreases the upstream channel volume available for dust storage. The impact of this higher density area is expected to diminish as the element height is increased as the inverted section would not change in size.

a portion of the pleat length from the second end 112 toward the first end 110.

In the arrangement of FIGS. 20-23, at least some of the major pleats 124 at the second end are inverted at section 235 (FIGS. 22-23) in an opposite direction of the rest of the pleat 104. In some embodiments, at least some of the minor pleats 126 at the second end 112 are inverted at section 237 (FIGS. 22-23) an opposite direction of the rest of the pleat 104.

In some embodiments, at least some of both the major pleats 124 and minor pleats 126 at the second end 112 are inverted at sections 235, 237, respectively, in an opposite direction of the rest of the pleat 104, along at least a portion of the pleat length from the second end 112 toward the first end 110.

In some embodiments, all of the major pleats 124 and minor pleats 126 at the second end 112 are inverted an opposite direction of the rest of the pleat 104, along at least a portion of the pleat length from the second end 112 toward the first end 110.

Figure 22:
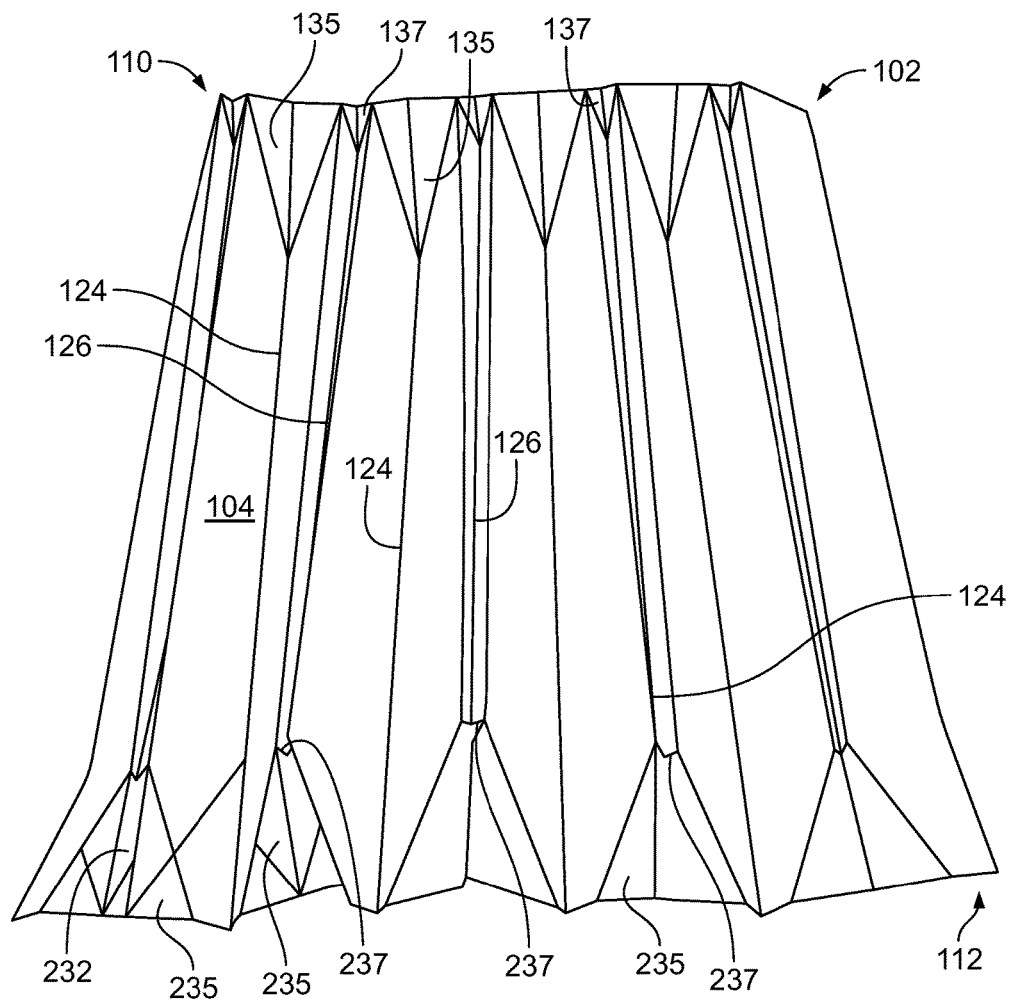
FIG. 22 is a perspective view of the folded media used to make the media pack of FIGS. 20 and 21.
Figure 23:
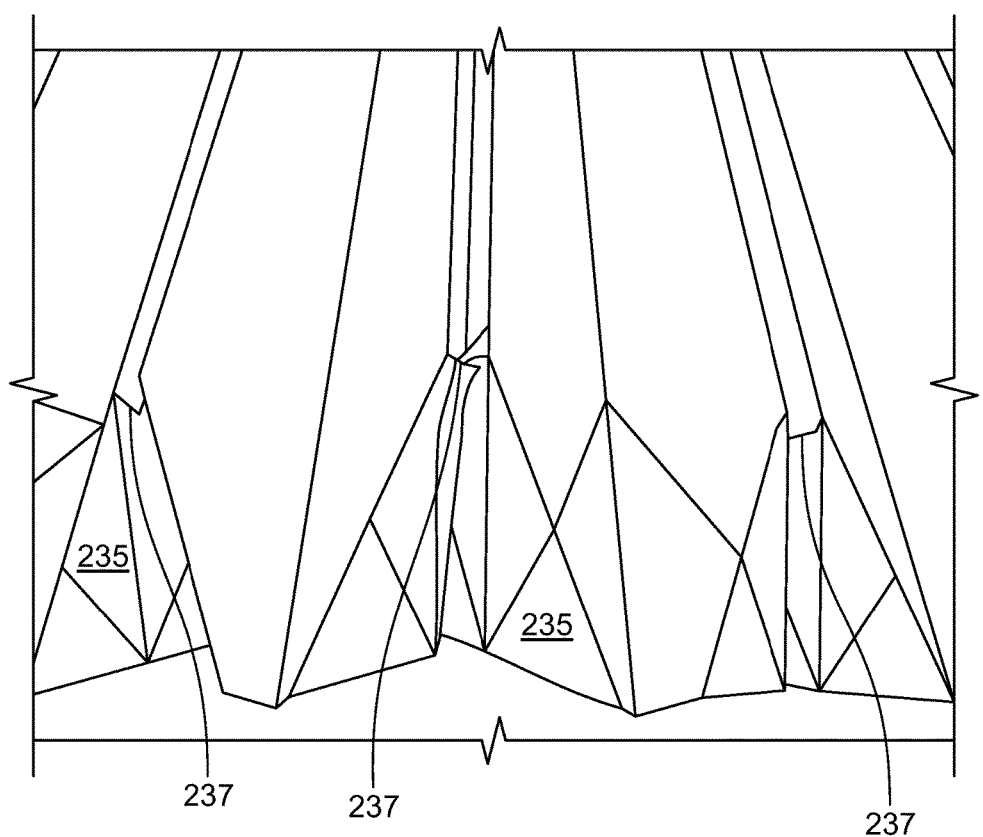
FIG. 23 is a close-up view of a portion of the folded media of FIG. 22.

In the embodiment depicted in FIGS. 22 and 23, all of the major pleats 124 and minor pleats 126 at both the first end 110 and second end 112 are inverted an opposite direction of the rest of the pleat 104; such that the inversion at the first end 110 is along at least a portion of the pleat length from the first end 110 toward the first end 112, and the inversion at the second end 112 is along at least a portion of the pleat

TABLE 1

Air Lab test parameters and results

|  | Std. Product | Std. Product (Cut to match Height of Others) | Variable heightPleat | Variable heightPleat + Inversions (FIGS. 1-13) |
|---|---|---|---|---|
| Flow (scfm) | 275 | 275 | 275 | 275 |
| Pleat Depth (in) | 1.13 | 1.13 | 1.5/0.38 | 1.5/0.38 |
| ID Pleat Count | 165 | 165 | 111 | 111 |
| OD Pleat Count | 165 | 165 | 222 | 222 |
| Outer Diameter (in) | 6.5 | 6.5 | 6 | 6 |
| Inner Diameter (in) | 4.25 | 4.25 | 3 | 3 |
| Length (in) | 13.5 | 10.3 | 10.3 | 10.3 |
| Space Velocity (s$^{-1}$) | 17.7 | 23.2 | 27.2 | 26.8 |
| Media Face Vel (fpm) | 7.9 | 10.4 | 9.2 | 9.2 |
| Media Area (in$^2$) | 5012 | 3824 | 4287 | 4287 |
| Total Volume (in$^3$) | 448 | 342 | 291 | 295 |
| Pack Volume (in$^3$) | 256 | 196 | 218 | 201 |
| OD Pleat Conc. (in$^{-1}$) | 8.1 | 8.1 | 11.8 | 11.8 |
| ID Pleat Cone (in$^{-1}$) | 12.4 | 12.4 | 11.8 | 11.8 |
| Dust @ 17" H$_2$O (g) | 880 | 516 | 625 | 648 |
| Dust @ 15" H$_2$O Rise (g) | 883 | 524 | 721 | 641 |
| Dust Load per Media Area @ 15" H2O Rise (g/in$^2$) | 0.18 | 0.14 | 0.17 | 0.15 |
| Element Load (g/in$^3$) @ 15" H$_2$O Rise | 1.97 | 1.53 | 2.48 | 2.17 |
| Pack Load (g/in$^3$) @ 15" H$_2$O Rise | 3.44 | 2.68 | 3.30 | 3.19 |

[2]For the inverted pleat elements, the volume of the inversions and the larger interior volume was included in this calculation
[3]Even though the media area is the same the pack volume is not, as the inverted sections of the pleats double back on themselves, effectively decreasing volume of the media pack.

FIGS. 22 and 23 illustrate an example embodiment of the pleated media pack 102, as described above and which description is herein incorporated by reference, but in which both the first end 110 and second end 112 have inverted sections 132 at end 110 and 232 at end 112. In this example, at least some of the pleats at the second end 112 are inverted an opposite direction of the rest of the pleat, along at least length from the second end 112 toward the first end 110. When arranged in this manner, the inversions at the first end 110 and second end 112 are in opposite directions from each other.

Figure 20:
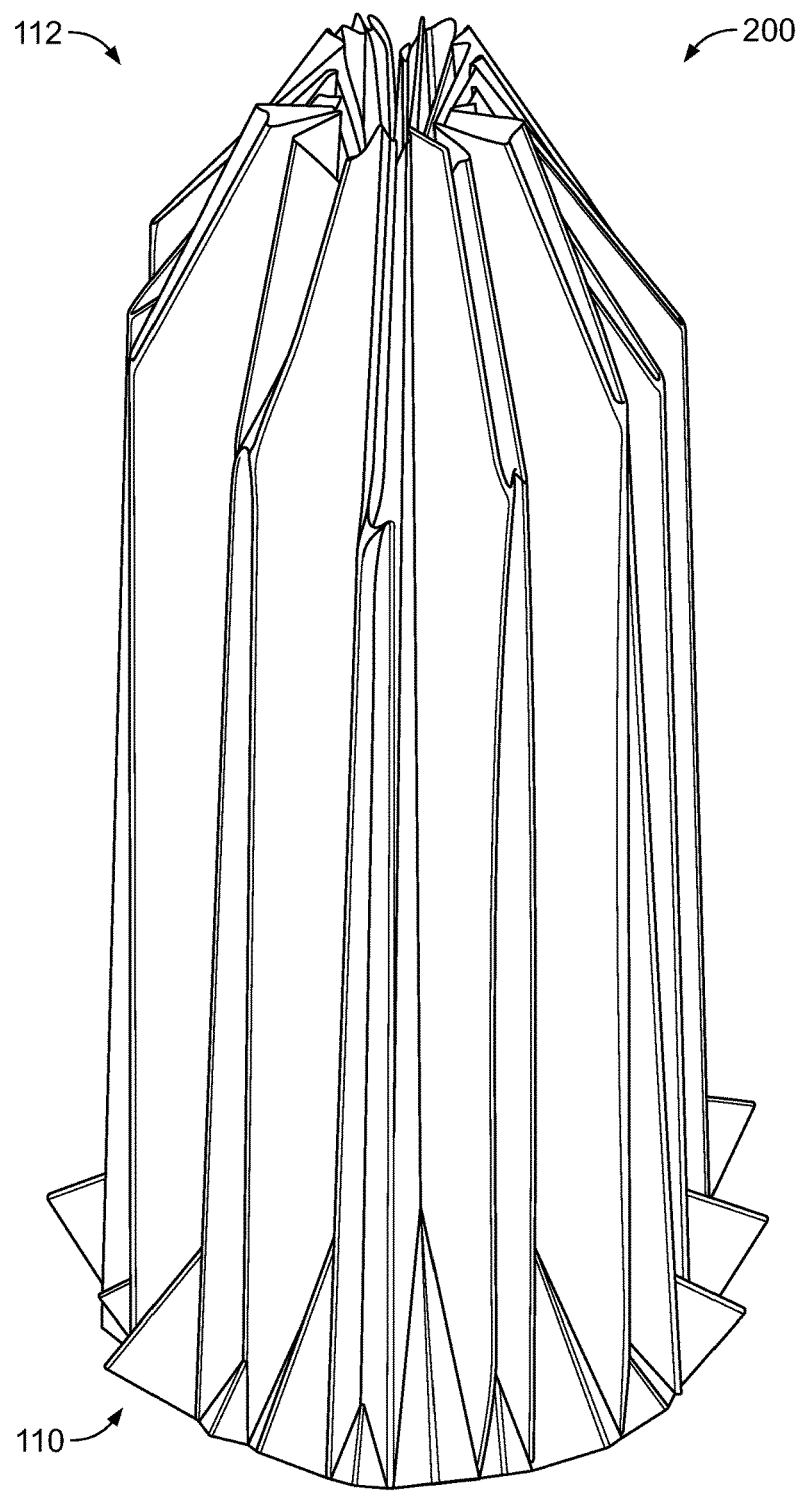
FIG. 20 is a schematic, perspective view of another embodiment of a media pack formed into a filter element, but before end caps are attached.
Figure 21:
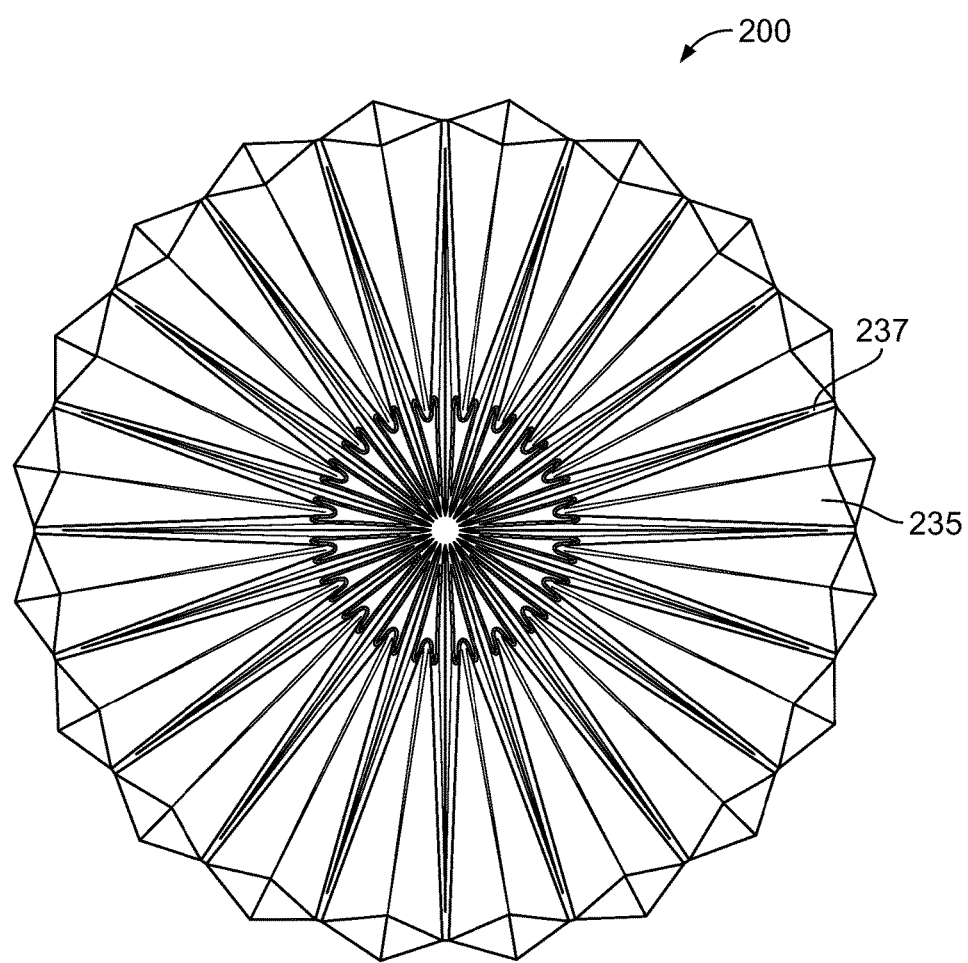
FIG. 21 is a top view of the element of FIG. 20.

The pleated media pack 102 is illustrated in FIGS. 20 and 21 as formed into filter element 200, but before end caps (such as end caps 120, 122 of the previous embodiment) are attached. In the example embodiment shown, the pleated media pack 102 includes the inversions at both the first end 110 and second end 112. FIG. 21 is a top plan view of the element 200, in which the inversions 235, 237 at the second end 112 are visible.

The above represents example principles and embodiments. Many embodiments can be made applying these principles.

What is claimed is:

1. A pleated media pack for use in a filter element; the media pack comprising:
   (a) a section of filtration media folded into pleats; at least some of the pleats having a major pleat depth; the pleats also include minor pleats having a minor pleat depth that is less than the major pleat depth;
   (b) the section of filtration media being configured into a tube defining an interior volume, first and second opposite ends; and an opening at the first end; the opening having an outer diameter;
   wherein at least some of the pleats at the first end have inverted sections that are inverted an opposite direction of the rest of the pleat, along only a portion of the pleat length from the first end toward the second end, the inverted sections projecting from and being radially outward of a remaining portion of the media pack; and
   at least some of the pleats at the second end are inverted an opposite direction of the rest of the pleat, along only a portion of the pleat length from the second end toward the first end.

2. The media pack of claim 1 wherein the major pleats and minor pleats alternate with each other.

3. The media pack of claim 1 wherein the major pleats and minor pleats are arranged in a repeating pattern.

4. The media pack of claim 1 wherein at least some of the major pleats at the first end are inverted an opposite direction of the rest of the pleat, along at least a portion of the pleat length from the first end toward the second end.

5. The media pack of claim 1 wherein at least some of the minor pleats at the first end are inverted an opposite direction of the rest of the pleat, along at least a portion of the pleat length from the first end toward the second end.

6. The media pack of claim 1 wherein the major pleats and minor pleats at the first end are inverted an opposite direction of the rest of the pleat, along at least a portion of the pleat length from the first end toward the second end.

7. The media pack of claim 1 wherein at least some of the major pleats at the second end are inverted an opposite direction of the rest of the pleat, along at least a portion of the pleat length from the second end toward the first end.

8. The media pack of claim 1 wherein at least some of the minor pleats at the second end are inverted an opposite direction of the rest of the pleat, along at least a portion of the pleat length from the second end toward the first end.

9. The media pack of claim 1 wherein the major pleats and minor pleats at the second end are inverted an opposite direction of the rest of the pleat, along at least a portion of the pleat length from the second end toward the first end.

10. The media pack of claim 1 wherein a ratio of the pleat depth to the opening diameter is greater than 0.1.

11. The media pack of claim 1 wherein a ratio of the pleat depth to the opening diameter is not greater than 0.5.

12. The media pack of claim 1 wherein a ratio of the pleat depth to the opening diameter is between 0.2 and 0.35.

13. A filter element according to claim 1, the filter element comprising:
   (a) a first open end cap secured to the first end of the media pack; and
   (b) a second end cap secured to the second end of the media pack.

14. A filter element according to claim 13 wherein the second end cap is a closed end cap.

15. A filter element according to claim 13 wherein the first open end cap defines an outlet opening for an exit of filtered fluid.

* * * * *